United States Patent
Ishikawa et al.

(10) Patent No.: US 7,398,844 B2
(45) Date of Patent: Jul. 15, 2008

(54) HYBRID VEHICLE

(75) Inventors: Tetsuhiro Ishikawa, Nishikamo-gun (JP); Hiroshi Yoshida, Anjo (JP); Takeshi Mogari, Nagoya (JP); Hitoshi Sato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 133 days.

(21) Appl. No.: 11/368,604

(22) Filed: Mar. 7, 2006

(65) Prior Publication Data

US 2006/0207813 A1    Sep. 21, 2006

(30) Foreign Application Priority Data

Mar. 16, 2005    (JP) .............................. 2005-075681

(51) Int. Cl.
*B60K 1/00* (2006.01)
(52) U.S. Cl. .................... 180/65.2; 180/65.6; 180/65.8; 903/943
(58) Field of Classification Search ................. 180/65.2, 180/65.4, 287, 65.3, 65.6, 65.8, 65.5; 903/923, 903/940, 941, 948, 943, 907; 60/284, 274, 60/300, 285; 701/113, 102
See application file for complete search history.

(56) References Cited

U.S. PATENT DOCUMENTS

| | | | | |
|---|---|---|---|---|
| 6,327,852 | B1 * | 12/2001 | Hirose | 180/65.4 |
| 6,421,599 | B1 * | 7/2002 | Lippa et al. | 701/102 |
| 6,792,750 | B2 * | 9/2004 | Nagai et al. | 60/285 |
| 7,110,904 | B2 * | 9/2006 | Lippa et al. | 60/285 |
| 2002/0065589 | A1 | 5/2002 | Ostberg et al. | |
| 2003/0102673 | A1 | 6/2003 | Nada | |
| 2004/0089491 | A1 * | 5/2004 | Reuter | 180/287 |
| 2005/0083017 | A1 * | 4/2005 | Suzuki | 320/128 |
| 2006/0168944 | A1 * | 8/2006 | Inoue et al. | 60/284 |
| 2006/0180362 | A1 * | 8/2006 | Yamaguchi et al. | 180/65.2 |

FOREIGN PATENT DOCUMENTS

| | | |
|---|---|---|
| EP | 1 157 873 A2 | 11/2001 |
| EP | 1 566 303 A1 | 8/2005 |
| JP | A 09-098514 | 4/1997 |
| JP | A 10-108304 | 4/1998 |
| JP | A 11-093722 | 4/1999 |
| JP | A-2000-115913 | 4/2000 |
| JP | A-2004-360528 | 12/2004 |
| JP | A-2005-002989 | 1/2005 |

* cited by examiner

*Primary Examiner*—Hau Phan
(74) *Attorney, Agent, or Firm*—Oliff & Berridge, PLC (57) ABSTRACT

A battery and a capacitor having a large capacity correspond to a power storage device for storing power used by a motor generator MG2. A controller detects state of charge of the battery and of the capacitor. When the driver issues an instruction requesting acceleration, the controller monitors the state of charge of the power storage device, and the controller instructs an inverter to increase contribution of the motor generator MG1 to an acceleration operation when the state of charge is insufficient to be larger than the contribution of the motor generator MG1 to the acceleration operation when the state of charge is sufficient. Thus a hybrid vehicle can be provided that allows a driver to feel smooth acceleration even if the power storage device is insufficiently charged.

4 Claims, 6 Drawing Sheets

HYBRID VEHICLE

This nonprovisional application is based on Japanese Patent Application No. 2005-075681 filed with the Japan Patent Office on Mar. 16, 2005, the entire contents of which are hereby incorporated by reference.

BACKGROUND OF THE INVENTION

1. Field of the Invention

The present invention relates generally to hybrid vehicles and particularly to hybrid vehicles employing a motor together with an engine.

2. Description of the Background Art

In recent years, electric vehicles, hybrid vehicles employing a motor together with an engine, and other similar vehicles considering environmental issues are increasingly gaining attention.

Japanese Patent Laying-Open No. 09-098514 discloses a vehicular power supply device mounted in a hybrid vehicle.

This vehicular power supply device can regenerate electrical energy from energy generated by braking a vehicle that is mainly or supplementarily driven by a motor. The vehicular power supply device has a power-feeding-and-charging circuit configured by a capacitor of large capacitance and a battery connected parallel to the motor, and a breaker allowing the capacitor and the battery to be independently connectable/disconnectable to the motor.

Therefore, even in a state of running in which acceleration and deceleration are repeated frequently, it is possible to sufficiently charge the capacitor of large capacitance to be ready for subsequent acceleration, and efficiency of energy regeneration can be improved.

The vehicular power supply device as disclosed in Japanese Patent Laying-Open No. 09-098514, however, has the following disadvantage: If the capacitor is insufficiently charged, an insufficient torque is caused, resulting in poor feel of acceleration. More specifically, if the capacitor is fully charged, optimum acceleration is provided. If the capacitor is insufficiently charged, however, the vehicle cannot provide a continuously increasing output, and hence cannot provide lasting acceleration. For sports type vehicles, in particular, it is desirable that smooth acceleration can be felt even if the capacitor is insufficiently charged.

SUMMARY OF THE INVENTION

The present invention contemplates a hybrid vehicle that allows smooth acceleration to be felt even if its power storage device is insufficiently charged.

The present invention as summarized is a hybrid vehicle including: a power storage device; an engine; a driving wheel; a first rotating electric machine mainly operating as a power generator; a second rotating electric machine rotating in synchronization with rotation of the driving wheel; a power split device coupled to a rotation shaft of the engine and to rotation shafts of the first and second rotating electric machines, wherein determination of rotation speed of any two rotation shafts among the three rotation shafts causes forced determination of rotation speed of residual one rotation shaft; an inverter driving the first and second rotating electric machines; an input device receiving an instruction requesting acceleration from a driver; and a controller monitoring a state of charge of the power storage device in response to the acceleration instruction, and instructing the inverter to increase contribution of the first rotating electric machine to an acceleration operation in a second state of insufficient state of charge to be larger than the contribution of the first rotating electric machine to the acceleration operation in a first state of sufficient state of charge.

Preferably, the power storage device includes a capacitor, and the controller monitors the state of charge of the power storage device based on a state of charge of the capacitor.

Preferably, the power storage device includes a secondary battery, and the controller monitors the state of charge of the power storage device based on a state of charge of the secondary battery.

Preferably, when the state of charge is the first state, the controller controls the torque such that the torque generated in the first rotating electric machine is kept zero for a predetermined time period in response to the acceleration instruction, and when the state of charge is the second state, the controller controls the torque such that the torque generated in the first rotating electric machine is kept zero for a time period shorter than the predetermined time period, in response to the acceleration instruction.

In accordance with the present invention, even if the power storage device is insufficiently charged, the driver can nonetheless feel growth and as a result feel smooth acceleration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter embodiments of the present invention will be described more specifically with reference to the drawings. In the figures, the same or corresponding portions are denoted by the same reference characters and description thereof will not be repeated.

Figure 1:
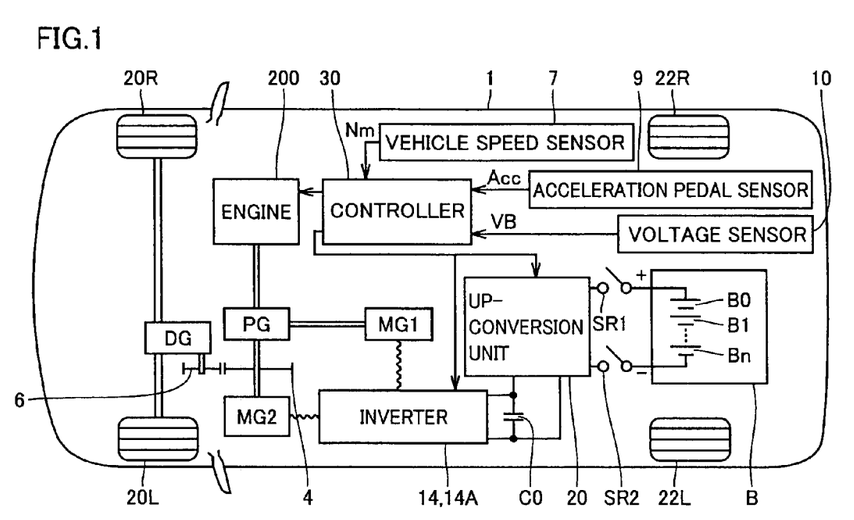
FIG. 1 schematically shows a configuration of a hybrid vehicle 1 in an embodiment of the present invention.

FIG. 1 schematically shows a configuration of a hybrid vehicle 1 in an embodiment of the present invention.

With reference to FIG. 1, hybrid vehicle 1 includes front wheels 20R and 20L, rear wheels 22R and 22L, an engine 200, a planetary gear PG, a differential gear DG, and gears 4 and 6.

Hybrid vehicle 1 further includes a battery B disposed in the vehicle at a rear position, an up-conversion unit 20 up-converting voltage in a direct current (dc) power output from battery B, inverters 14, 14A communicating the dc power with up-conversion unit 20, and a capacitor C0 having a large capacitance and connected between positive and negative power supply lines connecting up-conversion unit 20 and the inverters.

Hybrid vehicle 1 further includes a motor generator MG1 receiving power of engine 200 via planetary gear PG to generate electrical power, and a motor generator MG2 having a rotation shaft connected to planetary gear PG. Inverters 14, 14A are connected to motor generators MG1 and MG2 to provide conversion between alternate current (ac) power and dc power provided from the up-conversion circuit.

Planetary gear PG includes a sun gear, a ring gear, a pinion gear meshing with both the sun and ring gears, and a planetary carrier rotatably supporting the pinion gear around the sun gear. Planetary gear PG has first to third rotation shafts. The first rotation shaft is that of the planetary carrier, connected to engine 200. The second rotation shaft is that of the sun gear, connected to motor generator MG1. The third rotation shaft is that of the ring gear, connected to motor generator MG2.

The third rotation shaft has gear 4 attached thereto, which gear 4 drives gear 6 to transfer power to differential gear DG. Differential gear DG receives the power from gear 6 and transfers the power to front wheels 20R and 20L, and also receives torque of front wheels 20R and 20L and transfers it via gears 6 and 4 to the third rotation shaft of planetary gear PG.

Planetary gear PG serves to split power between engine 200 and motor generators MG1 and MG2. More specifically, when rotation of two rotation shafts of planetary gear PG is determined, the rotation speed of the remaining one rotation shaft will naturally be determined. Accordingly, engine 200 is operated in a most efficient range while the amount of power generated by motor generator MG1 is controlled, and motor generator MG2 is driven to control vehicle speed, to realize a generally energy-efficient vehicle.

Battery B as a dc power supply is, for example, implemented by a nickel metal hydride, lithium ion, or similar secondary battery, and supplies dc power to up-conversion unit 20 and is also charged with dc power provided from up-conversion unit 20.

Up-conversion unit 20 up-converts dc voltage received from battery B and supplies the up-converted dc voltage to inverters 14, 14A. Inverters 14, 14A receive the supplied dc voltage and convert it to ac voltage, and control driving motor generator MG1 when the engine is started. Furthermore, after the engine is started, ac power generated by motor generator MG1 is converted by inverters 14, 14A to a direct current and converted by up-conversion unit 20 to a voltage suitable for charging battery B, and thus battery B is charged.

Furthermore, inverters 14, 14A drive motor generator MG2. Motor generator MG2 assists engine 200 to drive front wheels 20R and 20L. In braking the vehicle, motor generator MG2 regeneratively operates to convert the rotation energy of the wheels to electrical energy. The obtained electrical energy is returned via inverters 14, 14A and up-conversion unit 20 to battery B.

Battery B is a set of batteries including a plurality of series-connected battery units B0-Bn. Between up-conversion unit 20 and battery B, system relays SR1, SR2 are provided to disconnect high voltage when the vehicle is not operated.

Hybrid vehicle 1 further includes an acceleration pedal position sensor 9 detecting the position of an accelerator pedal, which is an input portion receiving an instruction from a driver requesting acceleration, a voltage sensor 10 attached to battery B, and a controller 30 controlling engine 200, inverters 14, 14A, and up-conversion unit 20, in response to an accelerator pedal angle Acc received from acceleration pedal position sensor 9 and a voltage value VB received from voltage sensor 10. Voltage sensor 10 detects and transmits a voltage VB of battery B to controller 30.

Battery B and capacitor C0 correspond to a power storage device for storing power used by motor generator MG2. Controller 30 detects the state of charge of power battery B and of capacitor C0. When controller 30 receives an instruction from the driver requesting acceleration, controller 30 monitors the state of charge of the power storage device, and controller 30 instructs inverter 14 to increase contribution of motor generator MG1 to an acceleration operation when the power storage device is insufficiently charged to be larger than contribution of motor generator MG1 to the acceleration operation when the power storage device is fully charged.

Figure 2:
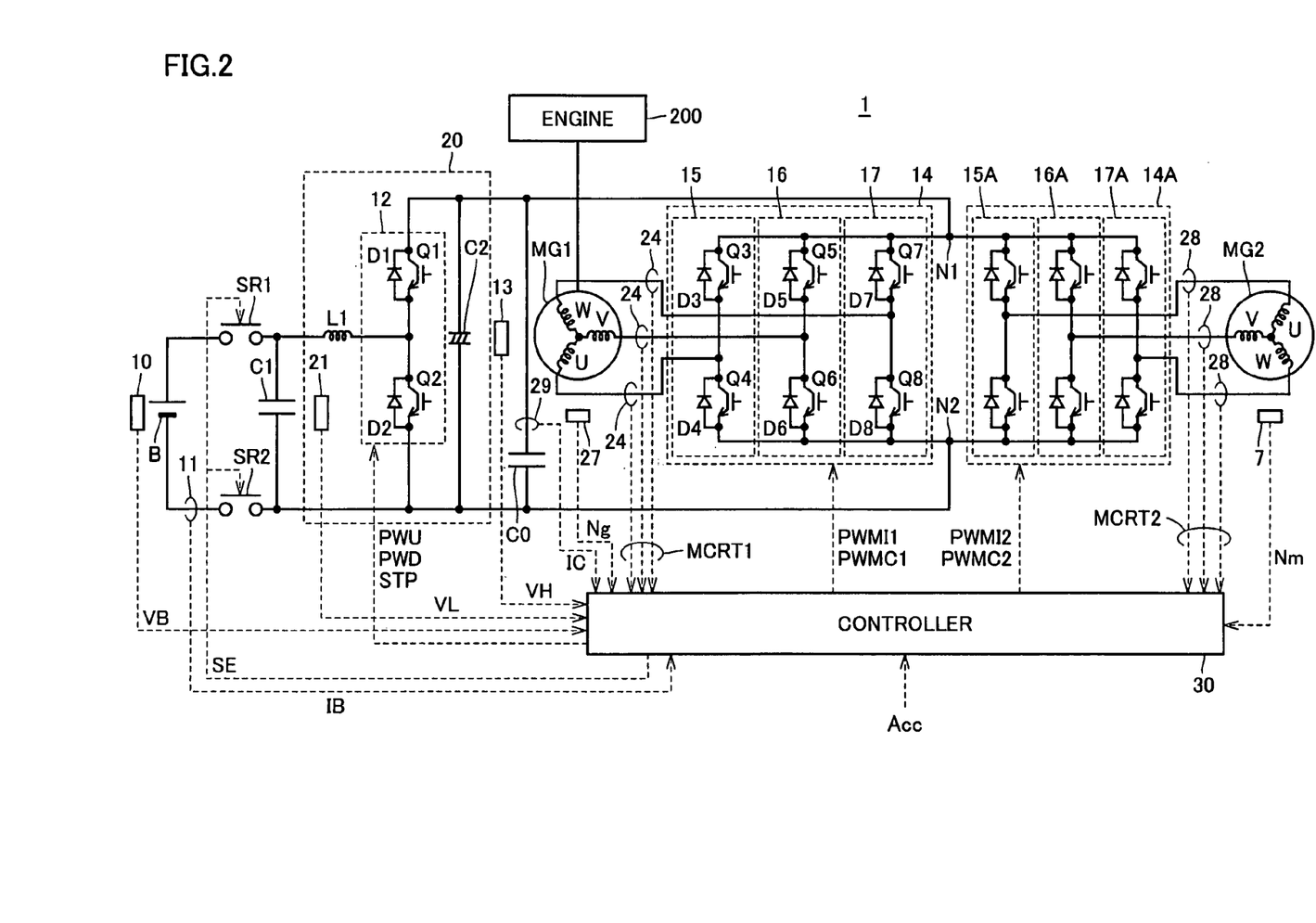
FIG. 2 is a circuit diagram specifically showing portions related to an inverter and an up-conversion unit of hybrid vehicle 1 of FIG. 1.

FIG. 2 is a circuit diagram specifically showing portions related to an inverter and an up-conversion unit of hybrid vehicle 1 of FIG. 1.

With reference to FIG. 2, hybrid vehicle 1 includes battery B. voltage sensor 10, system main relays SR1, SR2, capacitor C1, up-conversion unit 20, inverter 14, a current sensor 24, and controller 30.

Battery B is a nickel metal hydride, lithium ion, or similar secondary battery. Voltage sensor 10 detects a dc voltage value VB output from battery B and outputs the detected dc voltage value VB to controller 30. System main relay SR1, SR2, is turned on/off by a signal SE provided from controller 30. More specifically, system main relays SR1, SR2 are turned on by signal SE having H (logical high) level and turned off by signal SE having L (logical low) level. Capacitor C1 smooths voltage between terminals of battery B when system main relays SR1, SR2 are turned on.

Up-conversion unit 20 includes a voltage sensor 21, a reactor L1, a converter 12, and a capacitor C2. Reactor L1 has one end connected via system main relay SR1 to a positive electrode of battery B.

Current sensor 11 detects a dc current flowing between battery B and up conversion unit 20 and outputs the detected current as a dc current value IB to controller 30.

Converter 12 includes IGBT devices Q1 and Q2 connected in series between output terminals of converter 12 outputting a voltage VH, and diodes D1 and D2 connected parallel to IGBT devices Q1 and Q2, respectively.

Reactor L1 has the other end connected to an emitter of IGBT device Q1 and to a collector of IGBT device Q2. Diode D1 has a cathode connected to a collector of IGBT device Q1, and an anode connected to the emitter of IGBT device Q1. Diode D2 has a cathode connected to the collector of IGBT device Q2, and an anode connected to an emitter of IGBT device Q2.

Voltage sensor 21 detects, as a voltage value VL, a voltage of converter 12 that is present at an input thereof. Current sensor 11 detects, as current value IB, a current flowing through reactor L1. Capacitor C2 is connected to an output side of converter 12 and stores energy sent from converter 12, and also smoothest voltage.

Inverter 14 receives an up-converted potential from converter 12 to drive motor generator MG1. Furthermore, inverter 14 returns to converter 12 the power generated by motor generator MG1 as the vehicle is regeneratively braked. In doing so, converter 12 is controlled by controller 30 to operate as a down-conversion circuit.

Inverter 14 includes a U-phase arm 15, a V-phase arm 16, and a W-phase arm 17, which are connected in parallel between output lines of converter 12.

U-phase arm 15 includes series connected IGBT devices Q3 and Q4, and diodes D3 and D4 connected parallel to IGBT devices Q3 and Q4, respectively. Diode D3 has a cathode connected to a collector of IGBT device Q3, and an anode connected to an emitter of IGBT device Q3. Diode D4 has a cathode connected to a collector of IGBT device Q4, and an anode connected to an emitter of IGBT device Q4.

V-phase arm 16 includes series connected IGBT devices Q5 and Q6, and diodes D5 and D6 connected parallel to IGBT devices Q5 and Q6, respectively. Diode D5 has a cathode connected to a collector of IGBT device Q5, and an anode connected to an emitter of IGBT device Q5. Diode D6 has a cathode connected to a collector of IGBT device Q6, and an anode connected to an emitter of IGBT device Q6.

W-phase arm 17 includes series connected IGBT devices Q7 and Q8, and diodes D7 and D8 connected parallel to IGBT devices Q7 and Q8, respectively. Diode D7 has a cathode connected to a collector of IGBT device Q7, and an anode connected to an emitter of IGBT device Q7. Diode D8 has a cathode connected to a collector of IGBT device Q8, and an anode connected to an emitter of IGBT device Q8.

Each phase arm has an intermediate point connected to a phase end of a phase coil of motor generator MG1. More specifically, motor generator MG1 is a 3-phase, permanent magnet motor with three, U, V and W phase coils each having one end connected to a neutral point. The U-phase coil has the other end connected to a node connecting IGBT devices Q3 and Q4 together. The V-phase coil has the other end connected to a node connecting IGBT devices Q5 and Q6 together. The W-phase coil has the other end connected to a node connecting IGBT devices Q7 and Q8 together.

Current sensor 24 detects, as a motor current value MCRT1, a current flowing through motor generator MG1 and outputs motor current value MCRT1 to controller 30.

Controller 30 receives a torque control value TR1, rotation speed Ng of the motor, voltage values VB, VL and VH, current values IB and IC, and motor current value MCRT1.

Up-conversion unit 20 operates as will be described hereinafter. In a powering mode of operation, converter 12 in up-conversion unit 20 operates as an up-conversion circuit serving as a forward conversion circuit supplying inverter 14 with power provided from battery B. By contrast, in a regenerative mode of operation, converter 12 operates as a down-conversion circuit serving as a reverse conversion circuit to charge battery B with power regenerated by motor generator MG1.

When converter 12 has IGBT device Q1 turned off and IGBT device Q2 turned on and off, converter 12 operates as an up-conversion circuit. More specifically, when IGBT device Q2 is turned on, a path is formed to pass a current from the positive electrode of battery B through reactor L1 and IGBT device Q2 to the negative electrode of battery B. While the current flows, reactor L1 stores energy.

When IGBT device Q2 is turned off, the energy stored in reactor L1 flows through diode D1 toward inverter 14. This provides an increased voltage between electrodes of capacitor C2. Thus inverter 14 receives a boosted voltage output from converter 12.

When converter 12 has IGBT device Q2 turned off and IGBT device Q1 turned on and off, converter 12 operates as a down-conversion circuit. More specifically, when IGBT device Q1 is turned on, a current regeneratively provided from inverter 14 flows through IGBT device Q1 and the reactor to battery B.

Furthermore, when IGBT device Q1 is turned off, reactor L1, battery B and diode D2 forms a loop and energy stored in reactor L1 is stored to battery B through regeneration. In this reverse conversion, battery B receives power for a longer period of time than inverter 14 supplies power, and inverter 14 has voltage down-converted and stored to battery B through regeneration. Up-conversion unit 20 is operated by appropriately controlling the powering and regenerative operations as described above.

Note that regeneration control includes braking accompanied by power regeneration when a driver driving a hybrid vehicle, an electric vehicle or the like presses a foot brake pedal. Furthermore, even when the foot brake pedal is not operated, regeneration control also involves releasing the accelerator pedal during running, to decelerate or interrupt accelerating the vehicle while regenerating power.

Hybrid vehicle 1 further includes a current sensor 28 and inverter 14A.

Inverter 14A is connected between nodes N1 and N2, in parallel with inverter 14 and also connected together therewith to up-conversion unit 20.

Inverter 14A receives an up-converted potential from converter 12 to drive motor generator MG2. Furthermore, inverter 14A returns to converter 12 the power generated by motor generator MG2 as the vehicle is regeneratively braked. In doing so, converter 12 is controlled by controller 30 to operate as a down-conversion circuit. Motor generator MG2 rotates at a rate Nm, which is detected by a vehicle speed sensor 7.

Furthermore, for hybrid vehicles, engine 200 and motor generator MG1 communicate power, and motor generator MG1 sometimes starts the engine and sometimes operates as a generator receiving mechanical power from the engine to generate electrical power.

Inverter 14A includes U, V and W phase arms 15A, 16A, and 17A, respectively, connected in parallel between output lines of converter 12. U, V and W phase arms 15A, 16A and 17A are similar in configuration to U, V and W phase arms 15, 16 and 17, respectively. Therefore, description thereof will not be repeated.

Intermediate points of the U, V and W phase arms of inverter 14A are respectively connected to one end of U, V and W phase coils of the motor generator MG2. More specifically, motor generator MG2 is a 3-phase, permanent magnet motor with three U, V and W phase coils each having the other end connected to a neutral point.

Current sensor 28 detects a motor current value MCRT2 flowing through motor generator MG2 and outputs motor current value MCRT2 to controller 30.

Controller 30 receives torque control value TR1, the rotation speed MRN1 of the motor, voltage values VB, VL and VH, current values IB and IC and motor current value MRCT1, and in addition thereto, a torque control value TR2, the rotation speed Nm of the motor and motor current value MCRT2 corresponding to motor generator MG2.

In response to these inputs, controller 30 outputs to up-conversion unit 20 an instruction PWU to provide up-conversion, an instruction PWD to provide-down conversion, and an instruction STP to stop.

Furthermore, controller 30 outputs to inverter 14 an instruction PWMI1 to convert a dc voltage corresponding to an output of converter 12 to an ac voltage for driving motor generator MG1 and an instruction PWMC1 to convert ac voltage regenerated by motor generator MG1 to dc voltage and return the dc voltage to converter 12.

Furthermore, controller 30 outputs to inverter 14A an instruction PWMI2 to convert a dc voltage corresponding to an output of converter 12 to an ac voltage for driving motor generator MG2 and an instruction PWMC2 to convert ac voltage regenerated by motor generator MG2 to dc voltage and return the dc voltage to converter 12.

Hybrid vehicle 1 further includes capacitor C0 of a large capacity connected between nodes N1 and N2, a voltage sensor 13, a current sensor 29, and a rotation sensor 27.

Current sensor 29 detects a current value IC input to and output from capacitor C0. Rotation sensor 27 detects the rotation speed Ng of motor generator MG1.

Capacitor C0 of a large capacity is connected between positive and negative power supply lines connecting up-conversion unit 20 and the inverter. Voltage sensor 13 detects, as voltage value VH, a voltage present at an output of converter 12, that is, the voltage between electrodes of capacitor C0.

Controller 30 monitors current value IC and voltage value VH to assess the state of charge of capacitor C0.

When the vehicle is running, motor generator MG1 mainly operates as a power generator, and when the vehicle stops, motor generator MG1 operates as a motor to crank engine 200. Motor generator MG2 rotates in synchronization with rotation of a driving wheel. Engine 200 and motor generators MG1 and MG2 are connected to planetary gear PG shown in FIG. 1. Accordingly, if any two of the rotation shaft of the engine and those of motor generators MG1 and MG2 rotate at specific rate, the remaining one rotation shaft is forced to rotate at a specific rate.

Battery B and capacitor C0 of a large capacity correspond to a power storage device for storing power used by motor generator MG2. Controller 30 detects the state of charge of battery B from outputs received from current and voltage sensors 11 and 10. Furthermore controller 30 detects the state of charge of capacitor C0 from outputs received from voltage and current sensors 13 and 29.

When controller 30 receives an instruction from the driver requesting acceleration, controller 30 monitors the state of charge of the power storage device, and controller 30 instructs inverter 14 to increase contribution of motor generator MG1 to an acceleration operation when the power storage device is insufficiently charged to be larger than contribution of motor generator MG1 to the acceleration operation when the power storage device is fully charged.

Figure 3:
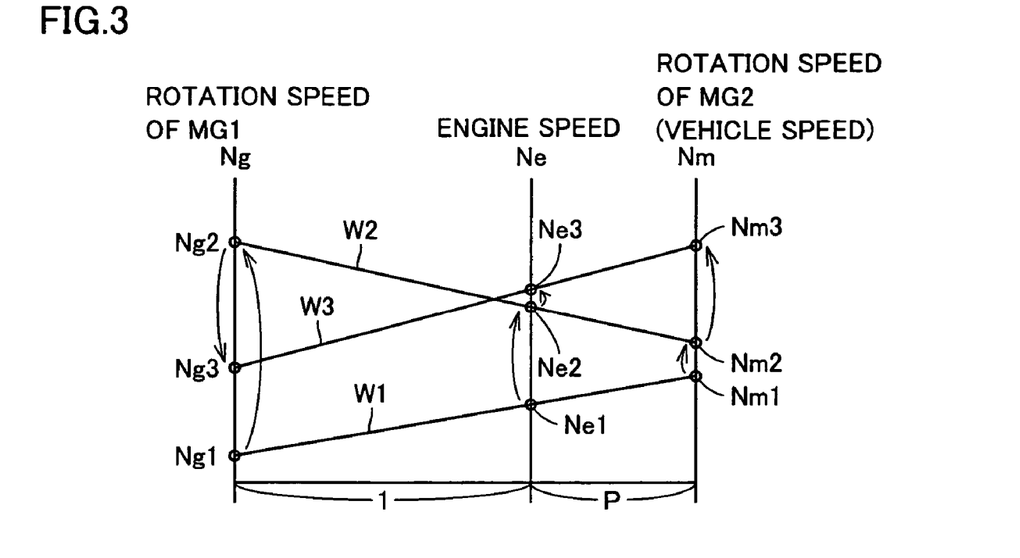
FIG. 3 illustrates how a planetary gear PG of FIG. 1 varies in acceleration in a nomograph.

FIG. 3 illustrates how planetary gear PG of FIG. 1 varies in acceleration in a nomograph.

Hybrid vehicle 1 has a power split device implemented by a planetary gear. As such, the rotation speed of motor generator MG1, the engine speed, and the rotation speed of motor generator MG2 vary in association with each other such that they align on a straight line, as shown in FIG. 3.

Engine speed Ne is the rotation speed of the planetary carrier. The rotation speed Ng of motor generator MG1 is the rotation speed of the sun gear. The rotation speed Nm of motor generator MG2 is the rotation speed of the ring gear.

More specifically, as planetary gear PG couples the motor generators and the engine, the rotation speed Ng, engine speed Ne and the rotation speed Nm satisfy the following relationship:

$$Ne = Nm \times 1/(1+\rho) + Ng \times \rho/(1+\rho) \qquad (1).$$

For sports type hybrid vehicles, the mechanism of planetary gear PG can be utilized to exert control with importance placed on acceleration.

Such control will generally be described as follows: Immediately after the accelerator pedal is pressed, an engine speed is rapidly increased and when the engine speed reaches a range of rotation allowing a large torque to be output, motor generator MG1 is thereafter used for sharp acceleration of the vehicle.

Initially, as shown in FIG. 3, assume that in a condition represented by a straight line W1, the accelerator pedal is pressed to instruct rapid acceleration of the vehicle. In response, the throttle valve varies in angle and the engine speed increases from Ne1 to Ne2.

At this time, if motor generator MG1 is controlled to provide a torque of zero, the engine speed rapidly increases. The rotation speed of motor generator MG2 increases slightly from Nm1 to Nm2 and the rotation speed of motor generator MG1 increases from Ng1 to Ng2. Thus a condition indicated by a straight line W2 is attained.

In a condition represented by straight lines W1 to W2, motor generator MG1 provides a torque controlled to be zero. As such, motor generator MG1 does not operate to generate power or supply motor generator MG2 with power. Accordingly, during transition from straight line W1 to straight line W2, motor generator MG2 uses power received from battery B and that stored in capacitor C0 to provide acceleration.

When the engine speed is increased to Ne2, the engine is now capable of outputting a large torque because of the increased engine speed, and motor generator MG1 is then controlled to generate a negative torque and the engine speed decreases from Ng2 to Ng3.

If the engine speed is maintained at Ne3 substantially equal to Ne2, by the operation of planetary gear, the rotation speed of motor generator MG2 increases from Nm2 to Nm3. As motor generator MG2 rotates in synchronization with a driving wheel, the rotation speed of motor generator MG2 is in conjunction with the speed of the vehicle. As such, by shifting from the condition corresponding to straight line W2 to that corresponding to straight line W3, rapid acceleration can be attained.

Thus, the instantaneous power of motor generator MG2 realized by using power stored in capacitor C0, and timely application of a negative torque to motor generator MG1 provide optimum acceleration for sports type vehicles.

However, if the capacitor is insufficiently charged and shifting from straight line W2 to W3 is controlled at the same timing as when the capacitor is fully charged, smooth acceleration would not always be possible. Accordingly, controller 30 exerts control, as described hereinafter, in accordance with the state of charge of the power storage device, to vary contribution of motor generator MG1 to the acceleration operation.

Figure 4:
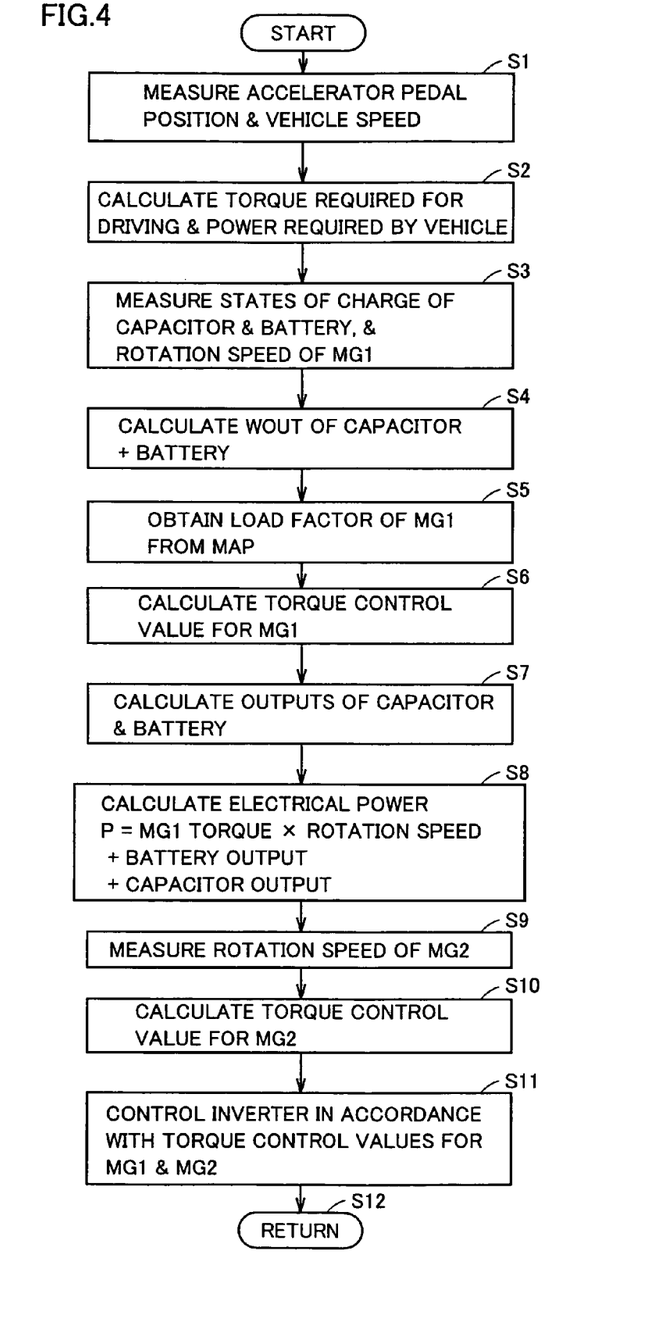
FIG. 4 is a flow chart illustrating how a control device 30 of FIG. 2 exerts control.

FIG. 4 is a flow chart illustrating how controller 30 of FIG. 2 exerts control.

The flow chart shown in FIG. 4 is called from a motor controlling main routine whenever a predetermined period of time elapses or a predetermined condition is established, to calculate a torque control value for motor generators MG1 and MG2 and thereby to control the inverter.

With reference to FIG. 4, initially at step S1, controller 30 measures the speed of the vehicle based on accelerator pedal position Acc received from acceleration pedal position sensor 9 and an output of rotation sensor 7 detecting the rotation speed of motor generator MG2.

Subsequently at step S2, from the accelerator pedal position and the vehicle speed, a torque required for a drive device and the power currently required for the vehicle are calculated. In general, power=rotation speed×torque, and accordingly this relationship is used to calculate the torque and the power.

Then at step S3, controller 30 measures the state of charge of capacitor C0 and of battery B as well as the rotation speed of motor generator MG1.

More specifically, the state of charge of capacitor C0 is measured based on current value IC obtained from an output of current sensor 29 and voltage value VH obtained from an output of voltage sensor 13, and the state of charge of battery B is measured based on current value IB obtained from an output of current sensor 11 and voltage value VB obtained from an output of voltage sensor 13. The rotation speed Ng of motor generator MG1 is obtained from rotation sensor 27.

Then at step S4, power WOUT dischargeable from capacitor C0 and battery B is calculated. Then at step S5, controller 30 obtains a load factor of motor generator MG1 from a map prepared beforehand.

Figure 5:
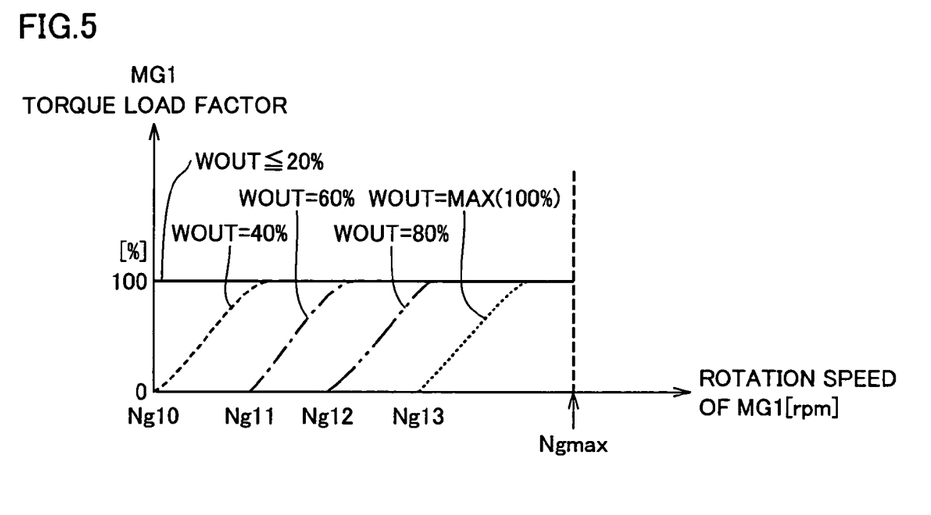
FIG. 5 shows a map used at step S5 in FIG. 4.

FIG. 5 represents the map used at step S5 in FIG. 4.

With reference to FIG. 5, the graph has a vertical axis representing a torque load factor of motor generator MG1 between 0% and 100% and a horizontal axis representing a rotation speed of up to the maximum rotation speed Ngmax of motor generator MG1.

First, if dischargeable power WOUT is at most 20%, the torque load factor of motor generator MG1 is set to be 100% for the entire range of rotation speed of motor generator MG1.

If dischargeable power WOUT is 40% and motor generator MG1 has a rotation speed smaller than Ng10, capacitor C0 and the battery power drive motor generator MG2 and, therefore, the torque of motor generator MG1 is set to zero. When motor generator MG1 attains a rotation speed exceeding Ng10, the torque load factor increases gradually from 0% to 100%.

If dischargeable power WOUT is 60% and motor generator MG1 has a rotation speed smaller than Ng11, capacitor C0 and the battery power drive motor generator MG2 and, therefore, the torque of motor generator MG1 is set to zero. When motor generator MG1 attains a rotation speed exceeding Ng11, the torque load factor increases gradually from 0% to 100%.

If dischargeable power WOUT is 80% and motor generator MG1 has a rotation speed smaller than Ng12, capacitor C0 and the battery power drives motor generator MG2 and, therefore, the torque of motor generator MG1 is set to zero. When motor generator MG1 attains a rotation speed exceeding Ng12, the torque load factor increases gradually from 0% to 100%.

If capacitor C0 and battery B are fully charged, that is, if dischargeable power WOUT is maximal, and motor generator MG1 has a rotation speed smaller than Ng13, capacitor C0 and the battery power drive motor generator MG2 and, therefore, the torque of motor generator MG1 is set to zero. When motor generator MG1 attains a rotation speed exceeding Ng13, the torque load factor increases gradually from 0% to 100%.

In other words, in accordance with the state of charge of the power storage device, contribution of motor generator MG1 to the acceleration operation is varied.

Again with reference to FIG. 4, if the load factor of motor generator MG1 is determined at step S5, then at step S6 the load factor of motor generator MG1 is multiplied by a prescribed numerical value to calculate a torque control value for motor generator MG1.

Subsequently at step S7, controller 30 calculates an output provided from capacitor C0 and that provided from battery B, and at step S8 controller 30 calculates electrical power usable at motor generator MG2. This electrical power P is calculated as: P=torque of MG1×rotation speed+battery output+capacitor output.

Subsequently at step S9, controller 30 measures a rotation speed of motor generator MG2 from rotation sensor 7. At step S10, controller 30 calculates a torque control value for motor generator MG2 from the electrical power obtained at step S8 and the rotation speed measured at step S9.

The process proceeds to step S11 and controller 30 controls inverters 14 and 14A in accordance with the torque control values for motor generators MG1 and MG2. The process then proceeds to step S12 and returns to the main routine.

Figure 6:
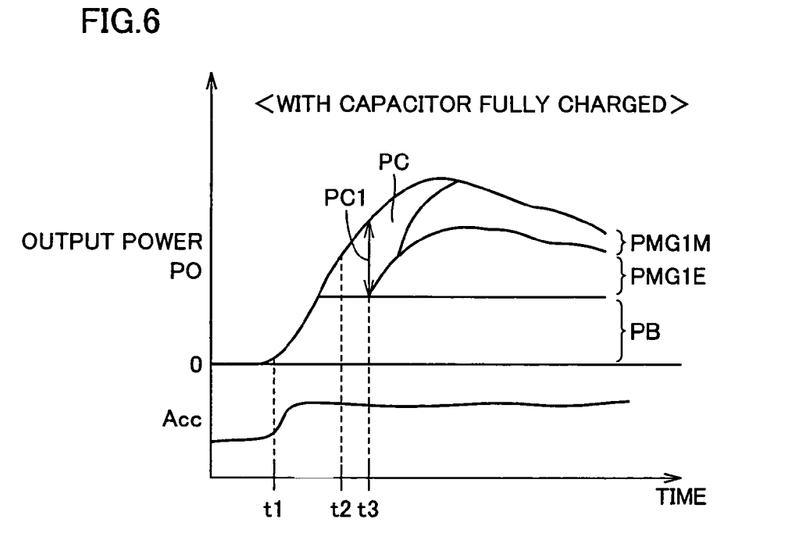
FIG. 6 represents power output when a capacitor is fully charged.

FIG. 6 represents power output when the capacitor is fully charged.

Figure 7:
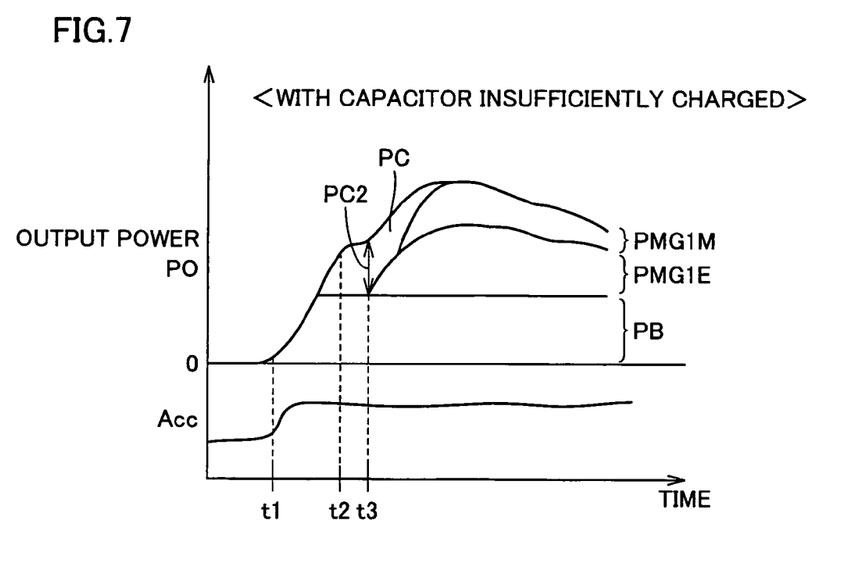
FIG. 7 represents power output when the present invention is not applied and a capacitor is insufficiently charged.

FIG. 7 represents power output when the present invention is not applied and the capacitor is insufficiently charged.

Figure 8:
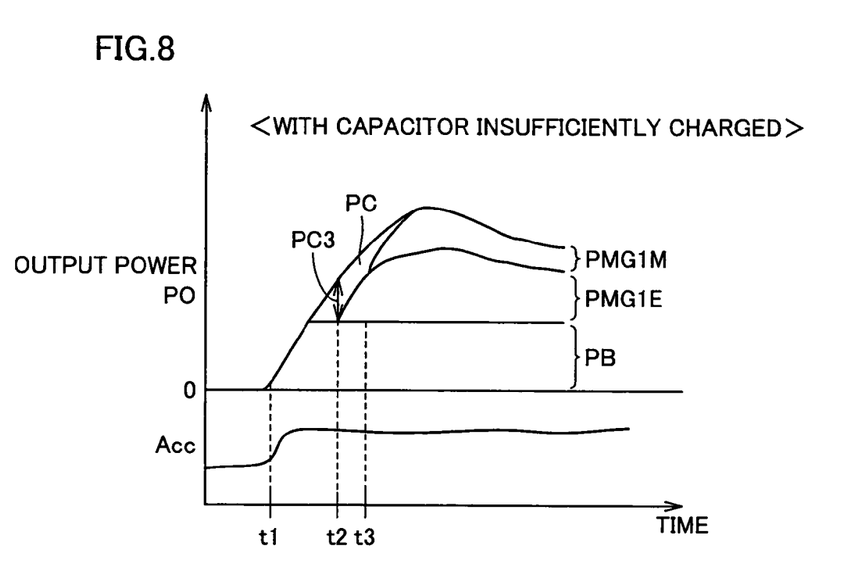
FIG. 8 represents power output when the present invention is applied and a capacitor is insufficiently charged.

FIG. 8 represents power output when the present invention is applied and the capacitor is insufficiently charged.

With reference to FIGS. 6-8, first, at time t1 the accelerator pedal is pressed and in response thereto, output power PO starts to increase. In the figures, component of output power PO is given as a total of powers in a number of ranges.

Power PB is power obtained from battery B. Power PC is obtained from capacitor C0. Power PMG1E is power obtained from electrical power generated by motor generator MG1. Power PMG1M is power provided to the rotation shaft of motor generator MG2 by reaction power when a negative torque is applied to motor generator MG1.

In FIG. 6, from time t1 to time t3 the torque of motor generator MG1 is controlled to be zero and during this period the engine speed increases. After time t3 motor generator MG1 is controlled to generate a negative torque, and power generated by motor generator MG1 is supplied to motor generator MG2. Motor generator MG2 can thus generate a further increased torque. Furthermore, because of mechanical coupling by the planetary gear, in accordance with the negative torque generated by motor generator MG1, a positive torque is generated at the rotation shaft of motor generator MG2.

In contrast, FIG. 7 shows an example in which capacitor C0 is insufficiently charged and the torque of motor generator MG1 is controlled to be zero from time t1 to time t3, in the similar manner as FIG. 6. In that case, at time t2 the power that can be output from capacitor C0 attains the upper limit PC2, and thereafter from time t2 to time t3 the driver cannot obtain a feel of acceleration. Thus smooth acceleration cannot be obtained.

In contrast, if the present invention is applied as shown in FIG. 8 and the capacitor is insufficiently charged, the map of FIG. 5 is used to vary contribution of motor generator MG1. As a result, at time t2 prior to time t3, a state in which motor generator MG1 has a torque of 0, ends.

After time t2 motor generator MG1 also contributes to acceleration. Although power output rises less sharply than shown in FIG. 6, it does not lose growth at a midpoint as shown in FIG. 7 and smooth acceleration can be felt even if the capacitor is insufficiently charged.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hybrid vehicle, comprising:
a power storage device;
an engine;
a driving wheel;
a first rotating electric machine mainly operating as a power generator;
a second rotating electric machine rotating in synchronization with rotation of said driving wheel;
a power split device coupled to a rotation shaft of the engine and to rotation shafts of the first and second rotating electric machines, wherein determination of rotation speed of any two rotation shafts among the three rotation shafts causes forced determination of rotation speed of residual one rotation shaft;

an inverter driving said first and second rotating electric machines;

an input device receiving an instruction requesting acceleration from a driver; and a controller monitoring a state of charge of the power storage device in response to the acceleration instruction, and instructing the inverter to increase contribution of the first rotating electric machine to an acceleration operation in a second state of insufficient state of charge to be larger than the contribution of the first rotating electric machine to said acceleration operation in a first state of sufficient state of charge.

2. The hybrid vehicle according to claim 1, wherein:

said power storage device includes a capacitor; and said controller monitors the state of charge of the power storage device based on a state of charge of said capacitor.

3. The hybrid vehicle according to claim 1, wherein:

said power storage device includes a secondary battery; and said controller monitors the state of charge of the power storage device based on a state of charge of said secondary battery.

4. The hybrid vehicle according to claim 1, wherein when said state of charge is said first state, said controller controls the torque such that the torque generated in said first rotating electric machine is kept zero for a predetermined time period in response to said acceleration instruction, and when said state of charge is said second state, said controller controls the torque such that the torque generated in said first rotating electric machine is kept zero for a time period shorter than said predetermined time period, in response to said acceleration instruction.

* * * * *